United States Patent
Wang et al.

(10) Patent No.: US 7,272,210 B1
(45) Date of Patent: Sep. 18, 2007

(54) SYSTEM AND METHOD FOR VOICE ORGANIZER MESSAGE DELIVERY

(75) Inventors: David Wei-Gwo Wang, Fremont, CA (US); Sherry Ling Chuang, Palo Alto, CA (US); Sudhir Ramesh Parikh, Cupertino, CA (US); Jaime Alberto Diamand, Buenos Aires (AR)

(73) Assignee: SS8 Networks, Inc., San Jose, CA (US)

( * ) Notice: Subject to any disclaimer, the term of this patent is extended or adjusted under 35 U.S.C. 154(b) by 742 days.

(21) Appl. No.: 10/040,781

(22) Filed: Dec. 28, 2001

Related U.S. Application Data

(60) Provisional application No. 60/259,508, filed on Jan. 2, 2001.

(51) Int. Cl.
*H04M 1/64* (2006.01)
(52) U.S. Cl. .................................. 379/88.12; 379/88.23
(58) Field of Classification Search ............... 379/67.1, 379/68, 69, 88.16, 88.12, 88.19, 88.22, 88.18
See application file for complete search history.

(56) References Cited

U.S. PATENT DOCUMENTS

| | | | | |
|---|---|---|---|---|
| 5,586,172 A | * | 12/1996 | Sakurai et al. ............ | 379/88.09 |
| 5,912,947 A | * | 6/1999 | Langsenkamp et al. ....... | 379/69 |
| 6,324,262 B1 | * | 11/2001 | Tuttle ........................... | 379/69 |
| 6,731,725 B1 | * | 5/2004 | Merwin et al. .......... | 379/88.23 |
| 6,754,484 B1 | * | 6/2004 | Hiltunen et al. ......... | 455/412.1 |
| 6,798,867 B1 | * | 9/2004 | Zirngibl et al. .......... | 379/88.17 |
| 2004/0131162 A1 | * | 7/2004 | Silver et al. ............. | 379/88.12 |
| 2005/0025298 A1 | * | 2/2005 | Finnigan ................... | 379/88.22 |

\* cited by examiner

*Primary Examiner*—Fan Tsang
*Assistant Examiner*—Joseph T Phan
(74) *Attorney, Agent, or Firm*—Morgan, Lewis & Bockius LLP

(57) ABSTRACT

The present invention is a voice organizer system having a message intake module, for storing a voice organizer message created by a first user, and a message delivery module. The message delivery module includes instructions for delivering the voice organizer message to a second user on a date specified by the first user, and periodically redelivering the voice organizer message at a frequency specified by the first user. The message delivery module may also include instructions for associating a passcode with the voice organizer message. The message delivery module may further include instructions for automatically calling the second user on the delivery date specified by the first user, and, if delivery of the voice organizer message fails, placing the voice organizer message in a voice mailbox associated with the second user.

18 Claims, 6 Drawing Sheets

Organizer Mailbox 170 

User Profile 210

| Mailbox # | 212 |
| PIN# | 214 |
| Other profile parameters | 216 |
| ... | |

Organizer Message Queue 220

| # of messages | 222 |
| Ptr to head (oldest msg) | 224 |
| Ptr to tail (newest msg) | 226 |
| ... | |

Message Data Structure 230

| Message size | 232 |
| Message location (on disk) | 234 |
| Date & Time to be Delivered | 236 |
| Frequency of Delivery | 238 |
| Passcode Associated with Message | 240 |
| Destination User ID | 242 |
| ptr to next message | 244 |
| ptr to previous message | 246 |
| ... | |

FIG. 2

SYSTEM AND METHOD FOR VOICE ORGANIZER MESSAGE DELIVERY

This application claims priority on U.S. provisional patent application 60/259,508, filed Jan. 2, 2001, which is hereby incorporated by reference.

The present invention relates generally to a voice organizer system that delivers voice organizer messages to users on specified dates and times, and periodically redelivers the messages at specified frequencies.

BACKGROUND OF THE INVENTION

Voice mail delivery systems are well known. Similarly, organizers that remind users of appointments are also well known. The present invention provides a new and unique system that combines voice mail technology with organizer service concepts to provide a voice organizer message delivery service that provides reminder messages to users.

SUMMARY OF THE INVENTION

In summary, the present invention is a method of voice organizer message delivery that includes recording a voice organizer message from a first user, storing the voice organizer message, delivering the voice organizer message to a second user upon a specified date, and periodically redelivering the voice organizer message at a specified frequency. A message-specific passcode may be associated with the voice organizer message. The method may further include automatically calling the second user to deliver the voice organizer message upon the specified delivery date and, if delivery fails, placing the voice organizer message in a voice mailbox associated with the second user.

The present invention is also a voice organizer system having a central processing unit, a message intake module for storing a voice organizer message created by a first user, and a message delivery module. The message delivery module includes instructions for delivering the voice organizer message to a second user on a date specified by the first user, and periodically redelivering the voice organizer message at a frequency specified by the first user. The message delivery module may also include instructions for associating a passcode with the voice organizer message. The message delivery module may further include instructions for automatically calling the second user on the delivery date specified by the first user, and, if delivery of the voice organizer message fails, placing the voice organizer message in a voice mailbox associated with the second user.

BRIEF DESCRIPTION OF THE DRAWINGS

Additional objects and features of the invention will be more readily apparent from the following detailed description and appended claims when taken in conjunction with the drawings, in which:

FIG. 2 is a block diagram of a preferred embodiment of an organizer mailbox in accordance with the present invention.

DESCRIPTION OF THE PREFERRED EMBODIMENTS

Figure 1:
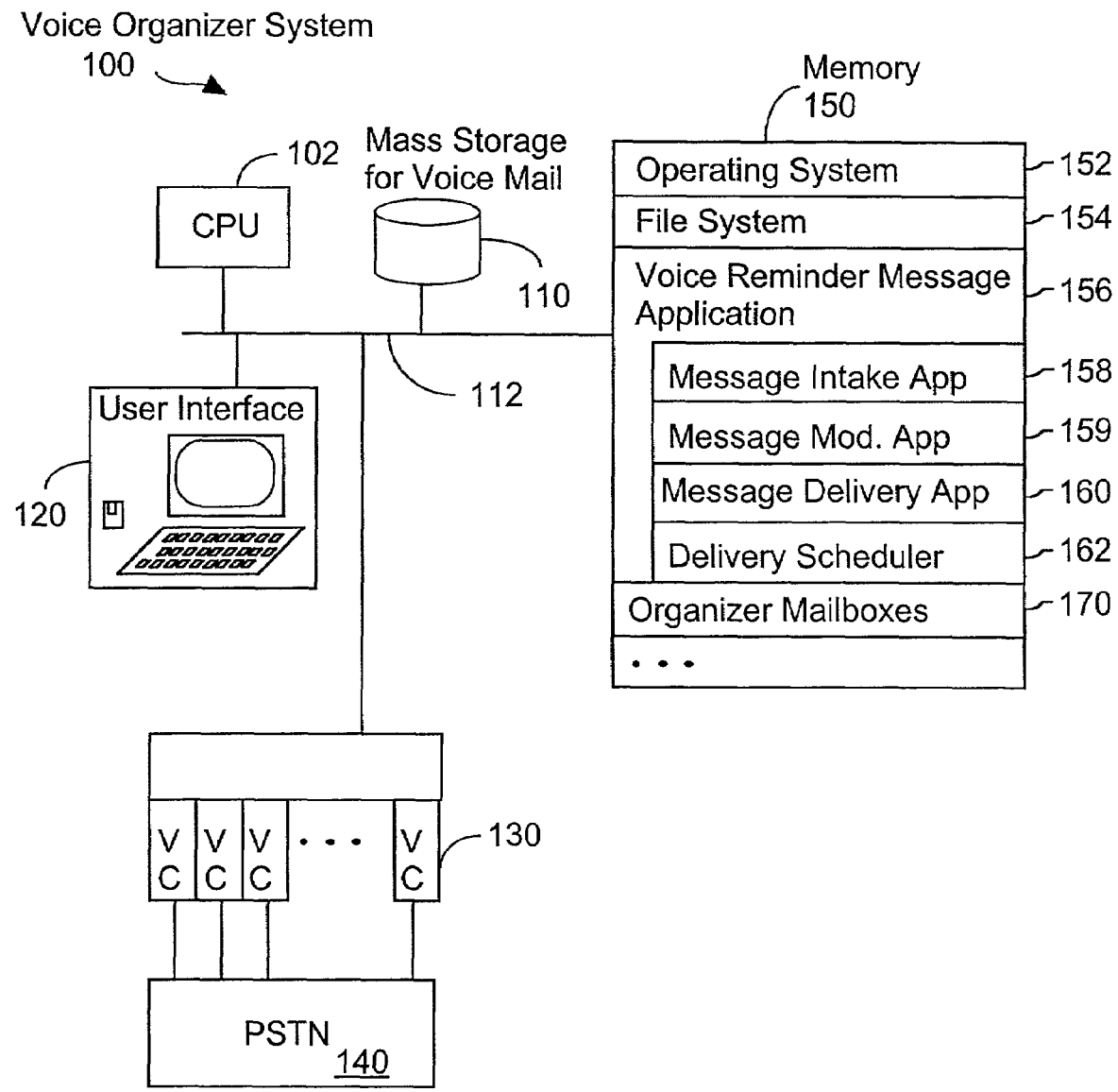
FIG. 1 is a block diagram of a preferred embodiment of a voice organizer system in accordance with the present invention.

Referring to FIG. 1, there is shown a voice organizer system 100. The system preferably includes a central processing unit 102, a user or system operator interface 120, one or more voice cards 130 for receiving phone calls from a public service telephone network 140, memory 150 (which may include random access memory as well as disk storage and other storage media), and one or more buses 112 for interconnecting the aforementioned elements of the system.

The operation of system 100 is controlled primarily by control programs that are executed by the system's central processing unit 102. In a typical implementation, the programs and data structures stored in the system memory 150 will include:

- an operating system 152 that includes procedures for handling various basic system services and for performing hardware dependent tasks;
- a file handling system 154;
- a voice organizer message application system 156, including an application 158 for creating new voice organizer messages, a message modification application 159, and a message delivery application 160;
- a message delivery scheduler 162 for invoking the message delivery application 160 whenever a reminder message is scheduled for delivery; the scheduler 162 may be part of the message application system 156 or the operating system 152; and
- organizer mailboxes 170 for use by the users of the voice organizer system.

Referring to FIG. 2, each organizer mailbox 170 preferably includes a user profile 210 and an organizer message queue 220. The user profile allows the system to configure the organizer mailboxes for each given user. The user profile 210, in a preferred embodiment, includes:

- a mailbox number 212;
- a PIN (personal identification) number 214, which is used as a password for accessing the user's mailbox; and
- other profile parameters 216.

The organizer message queue 220 includes:

- a field 222 specifying the number of messages in the queue;
- a pointer 224 to the message data structure (for the oldest message) at the head of the queue 220; and
- a pointer 226 to the message data structure (for the newest message) at the tail of the queue 220.

It is to be understood that what is stored in the organizer message queue 220 is not actual voice messages, but rather message headers with pointers to the disk locations at which the voice messages are stored.

In an exemplary embodiment, each message data structure 230 in the queue 220, corresponding to a particular stored message, preferably includes fields storing the following information:

- the size of the message 232;
- the disk location of the message 234;
- the date and time the message is to be delivered 236;
- the frequency of delivery 238;
- the passcode (if there is one) associated with the message 240;

the destination user ID of the user who will receive the message 242;

a pointer to the next message data structure 244; and a pointer to the previous message data structure 246.

It is to be understood that the order of the fields of the message queue and message data structure, as well as the particular set of fields in these data structures, may vary considerably from one implementation to another. Furthermore, such queue and message data structures will typically include other fields that are not relevant to the present discussion.

Figure 3:
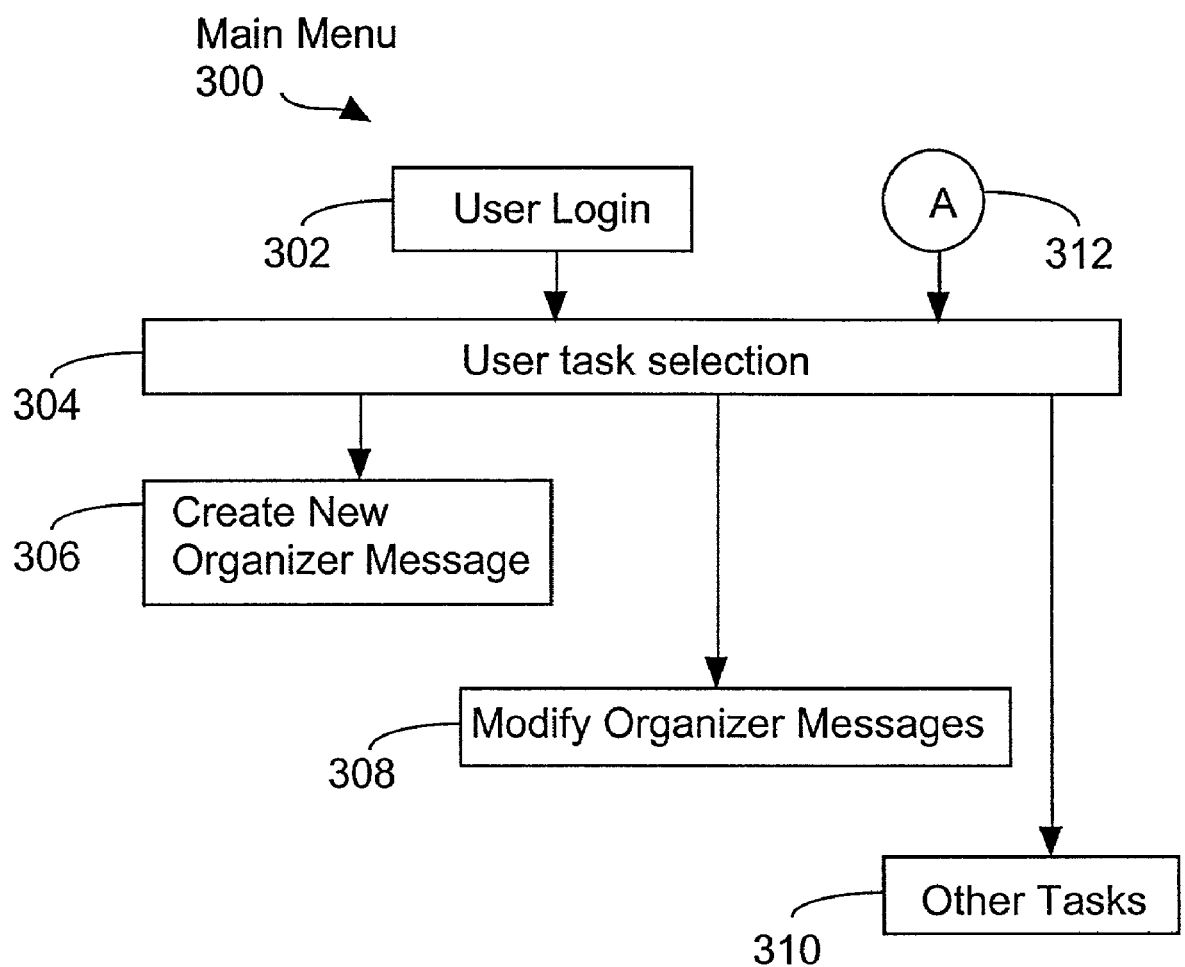
FIG. 3 is a flow chart of a preferred embodiment of the main menu describing a user interaction with the voice organizer system.

Referring to FIG. 3, the main menu 300 of the voice organizer system shows how a user interacts with the voice organizer system. First, the user logs into the system 302, typically by calling the system and entering a password or PIN to identify the user to the system. The user then enters a command to select one of the operations that the system can perform, including create new organizer message 306, modify organizer messages 308, and other tasks 310. Reference number 312 is a return path to the main menu from various applications within the voice organizer system.

Figure 4:
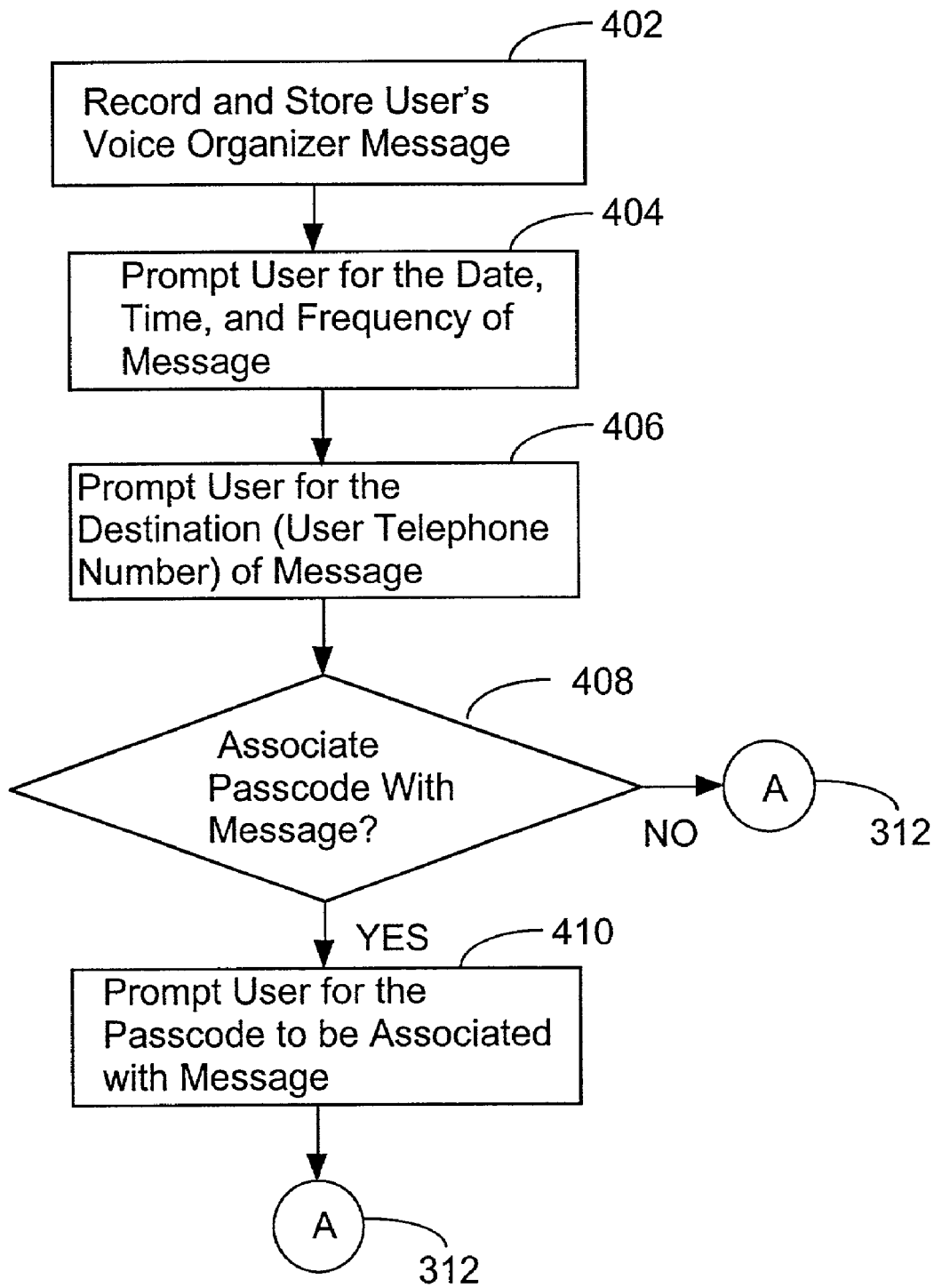
FIG. 4 is a flow chart of a preferred embodiment of a create new voice organizer message application.

FIG. 4 depicts a flow chart for the application 158 used to create a new voice organizer message. First, the user records and stores a voice organizer message 402. Step 402 of the application will typically include options (i.e., instructions) enabling the user to review, revise and replace the message before proceeding with the next step of the application. Next, the voice organizer system prompts the user for the date, the time and the frequency of delivery of the message 404. In the preferred embodiment, the frequency of message delivery will either be daily (where "daily" means every weekday for certain applications such as business applications, and means every day for other applications such as personal applications), weekly or monthly. The user may then specify a destination user to receive the message 406. The default destination user will preferably be the user who created the message. The user may specify another destination user in the preferred embodiment by entering the destination user's telephone or extension number. If the user would like to associate a passcode with the message 408, the user may do so 410. If not, the user will return to the user task selection 312 in the main menu (FIG. 3).

Figure 5:
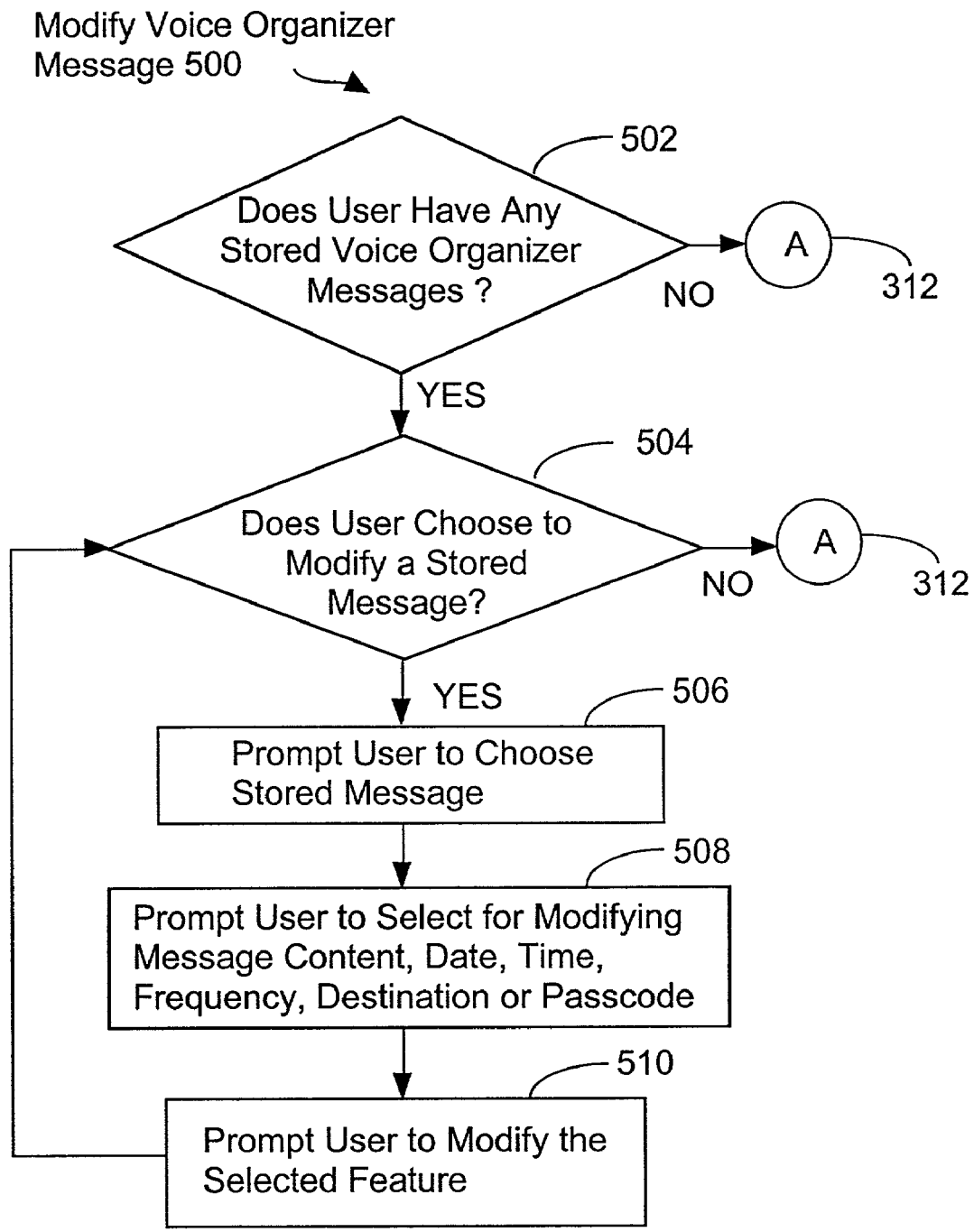
FIG. 5 is a flow chart of a preferred embodiment of a modify voice organizer message application.

Referring to FIG. 5, a flow chart for the procedure 159 for modifying voice organizer messages is shown. First, if the user does not have any stored voice organizer messages 502, the user is returned to user task selection 312. If the user has at least one stored voice organizer message 502, the user may choose to modify one of the stored voice organizer messages 504, 506. The user can edit the message content, the date the message is to be delivered, the time the message is to be delivered, the destination of delivery, or the passcode associated with the message 508, 510. If there is no passcode associated with the message, the user may add one. As is understood by one skilled in the art, the editing functions may be executed by entering a series of commands in response to choices provided by the voice organizer system. The user may then choose to modify another stored voice organizer message 504, or the user may return to the user task selection 312.

Figure 6:
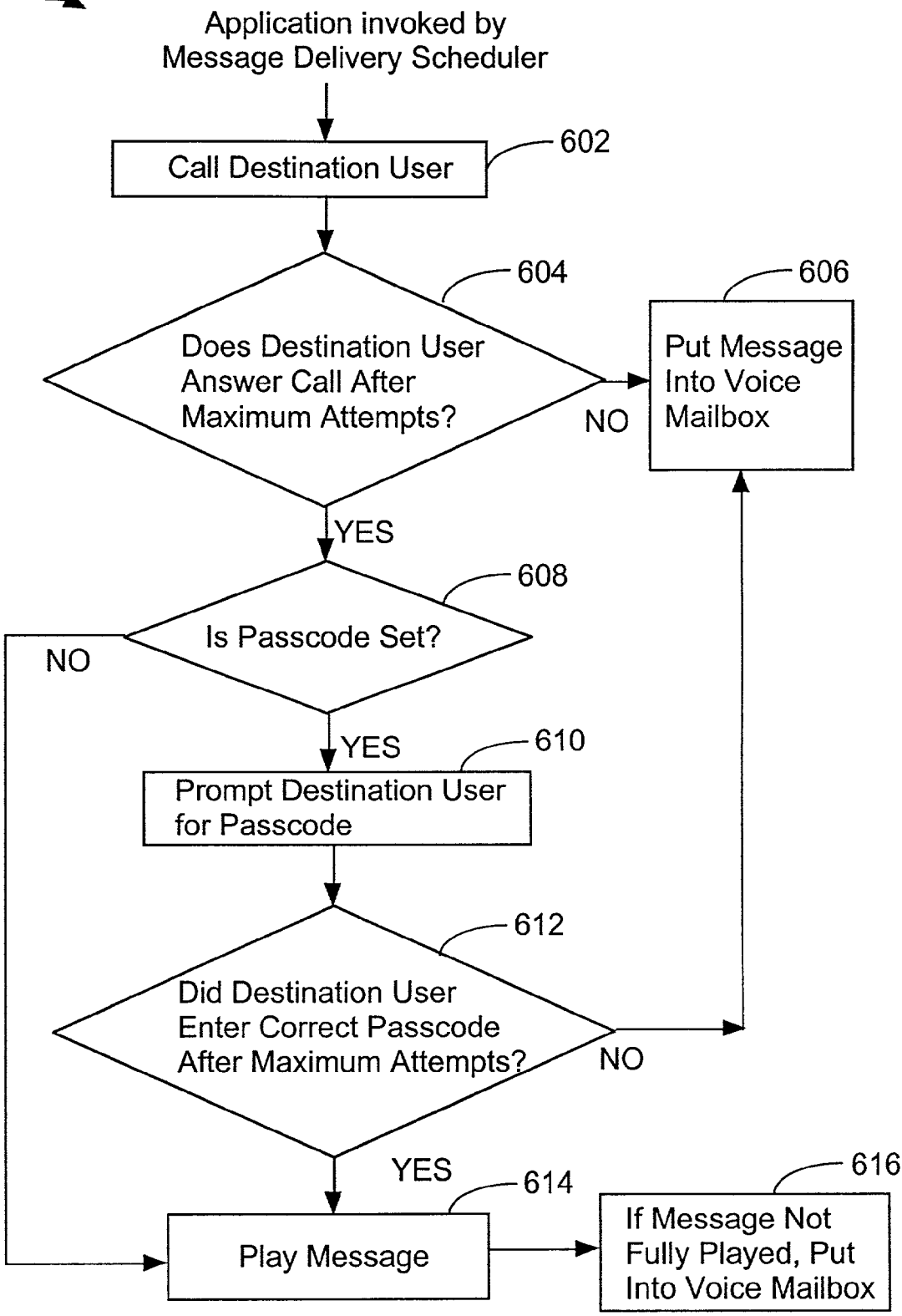
FIG. 6 is a flow chart of a preferred embodiment of a message delivery application in accordance with the present invention.

Referring to FIG. 6, a flow chart for the message delivery application 160 is shown. A scheduler 162 within either the voice organizer message application system 156 or within the operating system 152 (depending on the implementation), invokes the message delivery application 62 whenever it is time for any of the stored reminder messages to be delivered. The application, when invoked, calls the destination user 602. If the destination user does not answer the call after a maximum number of attempts 604, the voice organizer message is placed into a voice mailbox associated with the destination user 606. The destination user may not answer the call because the destination user is out of the service area, the destination user's telephone is switched off, or the destination user simply chooses not to answer the ringing telephone. The amount of calling attempts from the voice organizer system may vary from one embodiment to another. In the preferred embodiment, the voice mailbox is part of a voice mail system that operates in conjunction with the voice organizer system. In alternate embodiments, the voice mailbox is an integral part of the voice organizer system.

Returning to FIG. 6, if the destination user answers the call 604, the system determines if there is a passcode associated with the message 608. If a passcode is set, the system prompts the destination user to enter the passcode 610. If the destination user enters the correct passcode within a predefined maximum allowed number of attempts 612, the message is played 614. If the destination user fails to enter the correct passcode after the maximum allowed number of attempts 612, the message is placed into the voice mailbox associated with the destination user 606. The maximum number of attempts allowed before failure may vary from one embodiment to another. If the message begins playing, but is interrupted by the destination user, the message is put into the voice mailbox 616 associated with the user. The message may be interrupted because the destination user hangs up, or because there is a sudden signal loss between the destination user and the voice organizer system. After the message is fully played, it is automatically deleted, unless it is to be periodically redelivered. If the message is to be periodically redelivered, it is kept in the voice organizer mailbox of the message creator until such time as it is to be redelivered. As stated above, this preferably may be daily, weekly or monthly. The message delivery application 600 is run each time the message is scheduled for delivery.

ALTERNATE EMBODIMENTS

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of voice organizer message delivery comprising:

recording a voice organizer message from a first user;

storing the voice organizer message to be delivered to a second user on a specified date;

upon said specified date, delivering the voice organizer message to the second user;

if said delivery is incomplete, wherein the voice organizer message is not fully played to the second user, placing the voice organizer message in a voice mailbox associated with the second user; and periodically redelivering the voice organizer message at a frequency specified by the first user, wherein the frequency is selected from a group consisting of at least three frequencies.

2. The method of claim 1, wherein the second user and the first user are the same user.

3. The method of claim 1, wherein the at least three frequencies include daily, weekly and monthly.

4. The method of claim 1, further including responding to commands from the first user by modifying the voice organizer message.

5. The method of claim 1, further including responding to commands from the first user by changing the specified date of the voice organizer message.

6. The method of claim 1, further including responding to commands from the first user by changing the frequency of the voice organizer message.

7. A voice organizer system comprising:
a central processing unit;
a message intake module, executed by the central processing unit, for recording and storing a voice organizer message created by a first user;
a message delivery module, executed by the central processing unit, the message delivery module including instructions for:
  delivering the voice organizer message to a second user on a date specified by the first user;
  if said delivery is incomplete, wherein the voice organizer message is not fully played to the second user, placing the voice organizer message in a voice mailbox associated with the second user; and
  periodically redelivering the voice organizer message at a frequency specified by the first user, wherein the frequency is selected from a group consisting of at least three frequencies.

8. A computer program product for use in conjunction with a computer system, the computer program product comprising a computer readable storage medium and a computer program mechanism embedded therein, the computer program mechanism comprising:
a message intake module, executed by the computer system, for recording and storing a voice organizer message created by a first user;
a message delivery module, executed by the computer system, the message delivery module including instructions for:
  delivering the voice organizer message to a second user on a date specified by the first user;
  if said delivery is incomplete, wherein the voice organizer message is not fully played to the second user, placing the voice organizer message in a voice mailbox associated with the second user; and
  periodically redelivering the voice organizer message at a frequency specified by the first user, wherein the frequency is selected from a group consisting of at least three frequencies.

9. The voice organizer system of claim 7, wherein the second user and the first user are the same user.

10. The voice organizer system of claim 7, wherein the at least three frequencies include daily, weekly and monthly.

11. The voice organizer system of claim 7, further including a message modification module, executed by the central processing unit, that includes instructions for responding to commands from the first user by modifying the voice organizer message.

12. The voice organizer system of claim 7, further including a message modification module, executed by the central processing unit, that includes instructions for responding to commands from the first user by changing the specified date of the voice organizer message.

13. The voice organizer system of claim 7, further including a message modification module, executed by the central processing unit, that includes instructions for responding to commands from the first user by changing the frequency of the voice organizer message.

14. The computer program product of claim 8, wherein the second user and the first user are the same user.

15. The computer program product of claim 8, wherein the at least three frequencies include daily, weekly and monthly.

16. The computer program product of claim 8, further including a message modification module, executed by the computer system, that includes instructions for responding to commands from the first user by modifying the voice organizer message.

17. The computer program product of claim 8, further including a message modification module, executed by the computer system, that includes instructions for responding to commands from the first user by changing the specified date of the voice organizer message.

18. The computer program product of claim 8, further including a message modification module, executed by the computer system, that includes instructions for responding to commands from the first user by changing the frequency of the voice organizer message.

* * * * *